United States Patent [19]

Tipton

[11] 4,388,087
[45] Jun. 14, 1983

[54] CYCLONIC SEPARATOR-FILTER

[76] Inventor: Joe D. Tipton, 3521 Miller Park Dr., Garland, Tex. 75042

[21] Appl. No.: 290,859

[22] Filed: Aug. 7, 1981

[51] Int. Cl.³ .................. B01D 46/04; B01D 46/14; B01D 50/00
[52] U.S. Cl. .................................. 55/96; 55/273; 55/302; 55/324; 55/337; 55/385 D; 55/472; 55/498; 55/521; 175/66; 175/206
[58] Field of Search ............... 55/96, 272, 273, 283, 55/284, 302, 324, 337, 385 D, 472, 498, 521; 175/206, 66, 209

[56] References Cited

U.S. PATENT DOCUMENTS

| | | | |
|---|---|---|---|
| 2,844,216 | 7/1958 | Swanson | 55/302 X |
| 3,071,915 | 1/1963 | Hardy | 55/324 |
| 3,541,764 | 11/1970 | Astrom | 55/302 |
| 3,877,899 | 4/1975 | Bundy et al. | 55/302 X |
| 3,895,929 | 7/1975 | Jysky et al. | 55/337 X |
| 4,007,026 | 2/1977 | Groh | 55/302 |
| 4,099,937 | 7/1978 | Ufken et al. | 55/337 X |
| 4,299,597 | 11/1981 | Oetiker et al. | 55/302 X |

FOREIGN PATENT DOCUMENTS

| | | | |
|---|---|---|---|
| 625842 | 8/1961 | Canada | 55/302 |
| 1070667 | 1/1980 | Canada | 55/337 |
| WO80/00311 | 3/1980 | PCT Int'l Appl. | 55/324 |

OTHER PUBLICATIONS

Joe Tipton, Inc., "Filter/Clone Dust Control Systems", sales brochure, published in 1980 and describes single paper element cyclonic separator filter designed in 1979, Garland, Tex.

Primary Examiner—Kathleen J. Prunner
Attorney, Agent, or Firm—Robert G. Boydston

[57] ABSTRACT

Commercial pleated paper filter elements are applied at full rated gas flow capacity in applications requiring removal of large quantities of particulate matter from large volumes of flowing air or other gas by combining the elements as second stage filters with a primary stage cyclonic separator and operating both under vacuum conditions. Compact construction is provided by disposing the filter elements in the center of a vortex of the cyclonic separator and by providing a storage manifold within the cyclonic separator for compressed gas for pulsed back flow cleaning of the filter elements.

8 Claims, 5 Drawing Figures

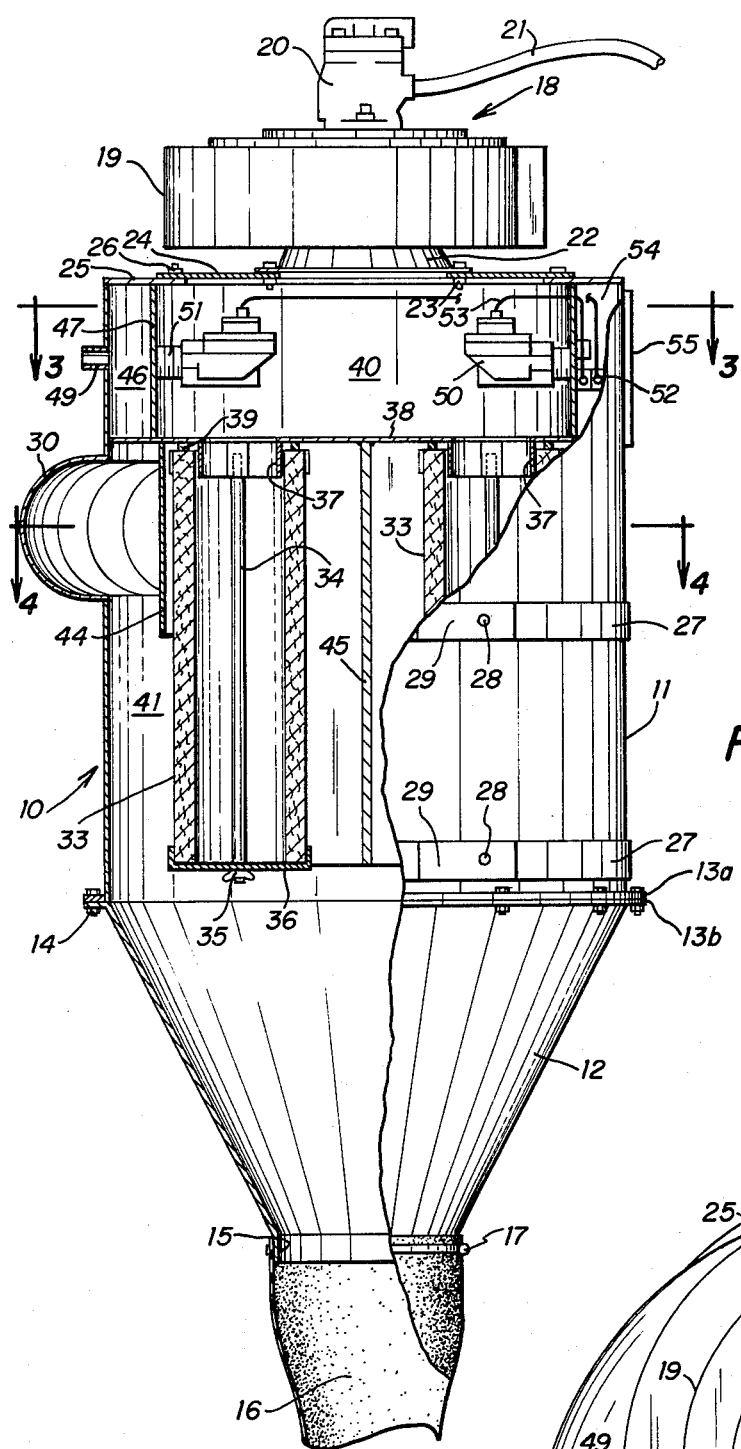
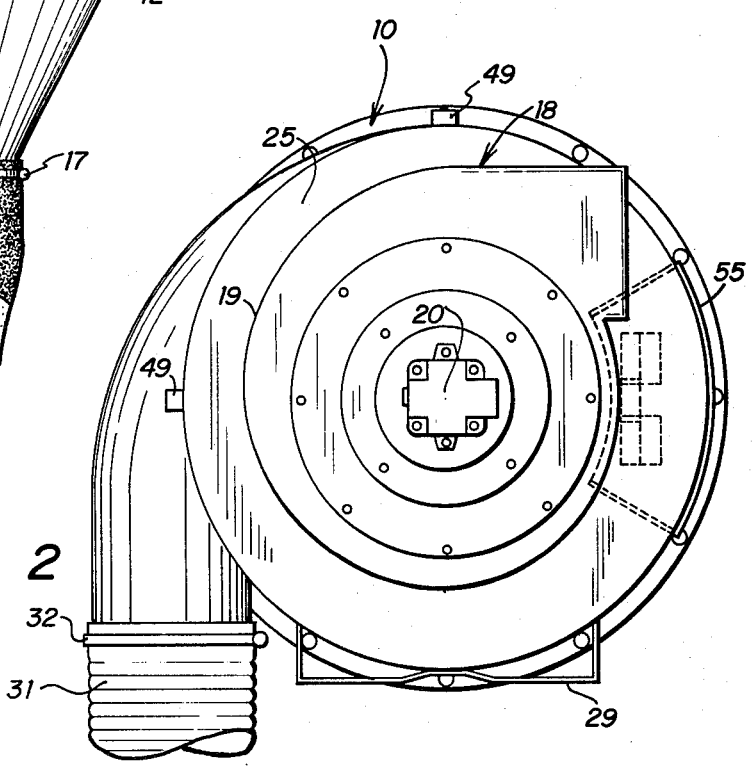
FIG. 1
FIG. 2

2

CYCLONIC SEPARATOR-FILTER

BACKGROUND OF THE INVENTION

Filtration of solid particles from a flowing gas is frequently desired and often necessary in a variety of industrial processes. Many chemical, refining and related processes require removal of particulate matter from a gas stream to clean the gas, to extract the particulate matter, or both. When a gas is to be discharged to the atmosphere, particle removal is both desirable and necessary to prevent air pollution, to maintain site and equipment cleanliness and to provide suitable conditions for workers. This invention, adaptable to many gas filtration applications, is particularly useful for cleaning dust-laden air discharged during the drilling of holes into the earth.

Many machines for drilling holes into the earth use compressed air to blow dirt and rock cuttings from the hole. Typically, the compressed air flows through a drill rod or pipe to orifices in the cutting tool where it is discharged into the drilled hole at atmospheric pressure and flows in large volume back through the drilled hole to the atmosphere, carrying particulate dust and larger cutting particles to the surface. Unless that air is filtered at the surface, the dust and cuttings cause a very dirty work site and wide ranging air pollution. Seepage water carried to the surface with the cuttings causes an added problem of clogging the surface of many filter mediums with mud and causing a breakdown of others, such as paper filter media.

Large volumes of air heavily laden with dust and cuttings must be continuously treated while drilling progresses, preferably without interruption. Filters capable of handling these large flow volumes have not been available in physical sizes small enough to mount on the drilling machines. The drilling machines vary in size from small crawler tractor and truck mounted portable units to large semi-portable truck, trailer or platform mounted drilling rigs.

Fabric bag filters of the type used for mechanical barrier separation of particles in many industrial plant processes have been tried and found to not be practical for these applications. For sufficient bag surface to filter a given air flow volume per unit time, a multi-bag filter unit of a physical size as large or larger than the drilling machine would be required. Bag filters have other limitations such as rapid wear, mud clogging in wet drilling conditions and continuous cleaning difficulties.

One approach to air filtration for these applications uses an array of pleated paper filter elements within a compartmentalized housing. The pleated paper elements are of the type commonly used for engine air intake filtration on stationary engines and off-the-road vehicle engines. A pleated paper element can provide a filter surface area equivalent to a bag filter element five or more times physically larger. However, the prior art, as particularly set forth in U.S. Pat. No. 4,218,227, is based on deration of the air flow velocity through the paper elements; the overall result being that the physical size of a multiple paper element filter unit of the prior art is less than that of a multi-bag filter unit of comparable air volume handling capacity, but the reduction in physical size then only amounts to about fifty percent because the paper elements are not utilized at full rated capacity.

This physical size reduction is significant but still results in a filter unit too large for easy portability and too large for drilling rig mounting in most cases. This adaptation of pleated paper filter elements has other limitations in that high pressure, 90 to 100 PSIG, compressed air is needed for element cleaning; water droplets, if present in the air stream, are carried into the paper elements causeelement deterioration, and large cutting particles can clog the required mechanical discharge valve. Because a large number of filter elements are needed for even a small drill application, a relatively complex arrangement of backcleaning pulse air valve controls is needed. Often alternating current electricity for operating these controls and the discharge valve motor is not available on a drilling rig.

It is, therefore, an object of this invention to provide a new and improved filter for separation of particulate matter from a flowing gas stream. It is a further object to provide an effective particle filter of smaller physical size than prior art filters for handling a relatively large gas flow volume. Another object is to provide such a filter capable of effectively filtering large flow volumes of air heavily laden with dust and cutting particles and small enough in size to mount on a portable drilling machine. Additionally, it is an object to provide such a filter that is operable without electric current or high pressure compressed air. Other objects and advantages of the invention will be apparent in the following summary and description.

SUMMARY OF THE INVENTION

Through the combination of a cyclonic separator and a plurality of full flow capacity rated pleated paper filter elements, the present invention effectively removes particulate matter from a flowing gas stream in a filtering unit of much smaller physical size than any previously available. A cyclonic separator-filter unit is provided with a centrifugal blower integrally mounted to the unit to induce a vacuum within the entire unit. Highly efficient primary stage separation occurs in a cyclonic separator, specifically designed for vacuum operation, where some ninety-eight percent of all particulate matter is separated from the gas flow. Because the remaining amount of particulate matter is small and because the gas density in the vacuum atmosphere is reduced, pleated paper filter elements are effectively utilized as secondary barrier filters without deration of rated flow capacity.

The filter elements are mounted inside a separator-filter unit housing and are the primary factor for determining the external size of the unit. Because the filter elements are utilized without deration, less elements are needed for a given flow capacity than with the prior art and the external size of the unit reduced accordingly. With a relatively small amount of particulate matter being deposited on the filter element surfaces, element cleaning is facilitated and elements do not tend to become clogged by heavy deposits of particulates between cleaning pulses. Element cleaning is accomplished by the known method of "back-blowing" the elements with intermittent pulses of compressed air directed into the filter elements against the flow of the gas being filtered. However, in the practice of the invention effective element cleaning occurs with only 40 PSIG compressed air whereas the prior art requires 90 to 100 PSIG for element cleaning. Therefore, no separate source of compressed air is required, whereas it is required on prior art filter units, when a separator-filter unit is used with an earth hole drilling machine that has available only 40 PSIG compressed air, the air pressure commonly used for drill hole cleaning.

Rapid opening and closing valves are utilized to provide brief, typically 100 to 200 milliseconds duration, pulses of compressed air for element cleaning. Effective cleaning requires that a large volume of air be discharged through each open valve to the interior of each related filter element during that brief pulse interval. The large air flow volume is achieved by maintaining a high flow velocity through the valve discharge orifice. Compressed air pressure in the range of 30 to 40 PSIG upstream of the valve have been found adequate to sustain the flow velocity in the required range while pressure levels above 40 PSIG do not significantly increase the flow velocity and, consequently, the volume of air discharged through the valve. As a practical matter, pressures above 40 PSIG are sometimes used and equally effective cleaning is achieved. The required compressed air pressure is maintained upstream of the valves by providing a large capacity compressed air reservoir so that the air pressure drops only a few pounds per square inch during each pulse discharge and the required minimum of 30 PSIG upstream of the discharging valve is maintained. The cylindrical configuration of the invention provides for an integrally formed compressed air storage manifold having that required large capacity.

Usually, one-fourth of the filter elements in the unit are subjected to pulse cleaning at any one time. A pneumatically, or occasionally, electrically, operated timer sequentially controls the opening and closing of compressed air discharge valves so that, in rotation, one-fourth of the filter elements are subjected to pulse cleaning at predetermined intervals. With the pulse intervals timed for a cleaning pulse of compressed air released every six to ten seconds, it has been found that effective element cleaning occurs and the vaccum atmosphere of the separator-filter unit is maintained. When connected to a pneumatic timer, the compressed air manifold provides a convenient reference source for the pulse intervals. As the pressure in the manifold reaches 40 PSIG, the pneumatic timer releases an "operate" signal to one-fourth of the pneumatically operated pulse air discharge valves through a connecting conduit. As the valve operates and discharges a pulse of cleaning air, the air pressure in the manifold drops a few pounds per square inch. This drop in air pressure is restored through an external constant source of 40 PSIG compressed air connected to the manifold. The interval of pressure restoration is controlled by an adjustable valve in the external compressed air supply line and, thus, the interval between timer control signals to the pulse air discharge valves is determined and controlled.

BRIEF DESCRIPTION OF THE DRAWINGS

In the drawing,

FIG. 1 is an elevation view of the two stage separator-filter, partially broken away to reveal interior components;

FIG. 2 is a top plan view;

DESCRIPTION OF THE PREFERRED EMBODIMENT

Figure 3:
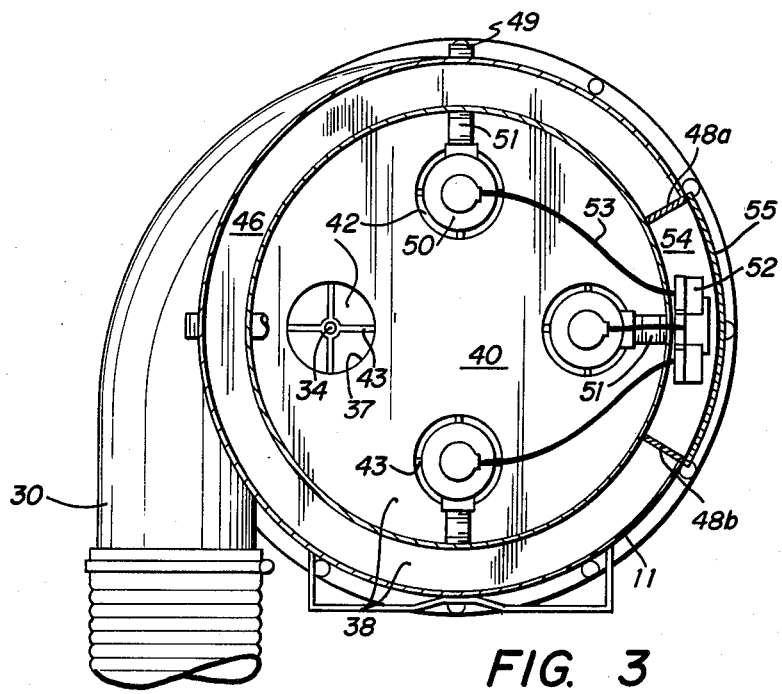
FIG. 3 is a cross-sectional view along the line 3—3 of FIG. 1.

The two stage separator-filter 10 is shown in FIGS. 1 and 2 to comprise a cyclone separator portion formed by a cylindrical housing 11 connected to a conical lower housing piece 12 that acts as the particulate matter receiver. The connection of these housing pieces 11 and 12 is accomplished with mating cylindrical housing flange 13a and conical lower housing piece flange 13b, each such flange being an integrally formed part of the housing piece with which it is associated or welded to such piece. The flanges are firmly held in mating engagement by a series of bolt and nut connectors 14 or other suitable fasteners evenly spaced around the circumference of the flanges. A short cylindrical outlet piece 15, either integrally formed with or welded to the cylindrical lower housing piece 12 is provided for connection of a flexible rubber or plastic dump hose 16 by a conventional hose clamp 17.

A centrifugal blower 18 is mounted to the top of the cylindrical housing 11. The blower 18 is comprised of a housing 19 and a suitable driving motor 20 connected to the blower inner working parts (not shown). In the preferred embodiment, the driving motor 20 is compressed air powered, receiving compressed air from an external source through a conduit 21. A hydraulic fluid powered motor 20 is often used, in which case the conduit 21 would enclose hydraulic hoses for conveyance of hydraulic fluid to and from the motor. Other types of acceptable blower driving means include a direct-connected electric motor or turbine or a v-belt sheave belt-connected to an appropriate power source. The blower 18 includes a flanged inlet piece 22 bolted with conventional bolt and nut connectors 23 to an annular mounting piece 24 that is in turn bolted to an annular cylindrical housing top piece 25 with a multiplicity of bolts 26. With the top piece 25 welded to the cylindrical housing 11, the interposition of the annular mounting piece 24 between the blower 18 and top piece 25 provides for access to an upper chamber 40 of the separator-filter 10.

The separator-filter 10 must be operated in an approximately vertical position with the dump hose 16 sufficiently elevated to provide for clearance of the separated particulate matter that drops by gravity through the lower housing piece 12. Therefore, a plurality of mounting straps 27 are affixed around the outer circumference of the cylindrical housing 11, with several bolt holes 28 provided in strap brackets 29 to connect the separator-filter 10 to a drilling machine, free-standing frame or whatever support fixture is available and desired by suitable bolting. The separator-filter is obviously adaptable to any number of mounting means other than described in this embodiment without effect on the essential operating features. For a movable drilling machine it is desirable to have the separator-filter mounted directly on the machine and that type mounting is facilitated by the strap means described.

Figure 5:
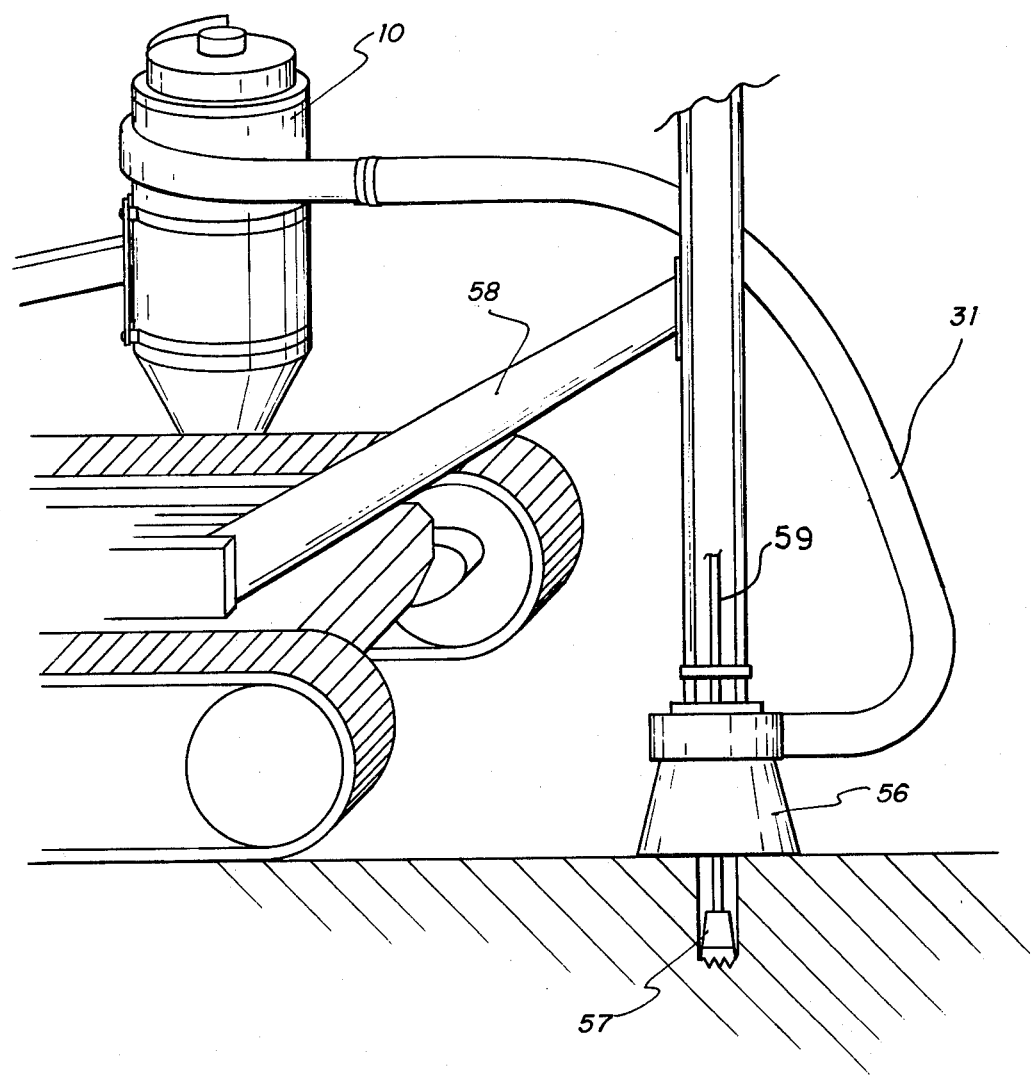
FIG. 5 is a partial perspective view of a drilling machine having a two-stage cyclonic separator-filter mounted thereon for use during earth hole drilling.

An inlet transition piece 30 is integrally formed into the cylindrical housing 11 and connected to a flexible conduit 31 by a standard hose clamp 32. Referring to FIG. 5, on a drilling machine 58 application this flexible conduit 31 leads to the source of unfiltered air at a collector collar and pick-up assembly 56 surrounding the drill rod 59 and covering the periphery of the drilled hole 57. The air laden with dust and cutting particles is forced by atmospheric pressure through the flexible conduit 31 to the vacuum atmosphere of the separator-filter 10.

A plurality of cylindrical pleated paper filter elements 33 are mounted in the central area of the cyclone vortex within the cylindrical housing 11 on tie rods 34. Each element 33 is centered and held in place by a nut 35 tightened along a threaded lower end of a tie rod 34 against an element closure and retainer plate 36. Each element 33 is also guided to centered location around a tie rod 34 by a cylindrical guide piece 37, welded and perpendicular to a chamber partitioning plate 38. A gasket 39 is compressed between an upper end of each filter element 33 and the partitioning plate 38 to provide a gas flow seal that prevents unfiltered air from by-passing the filter elements 33.

Figure 4:
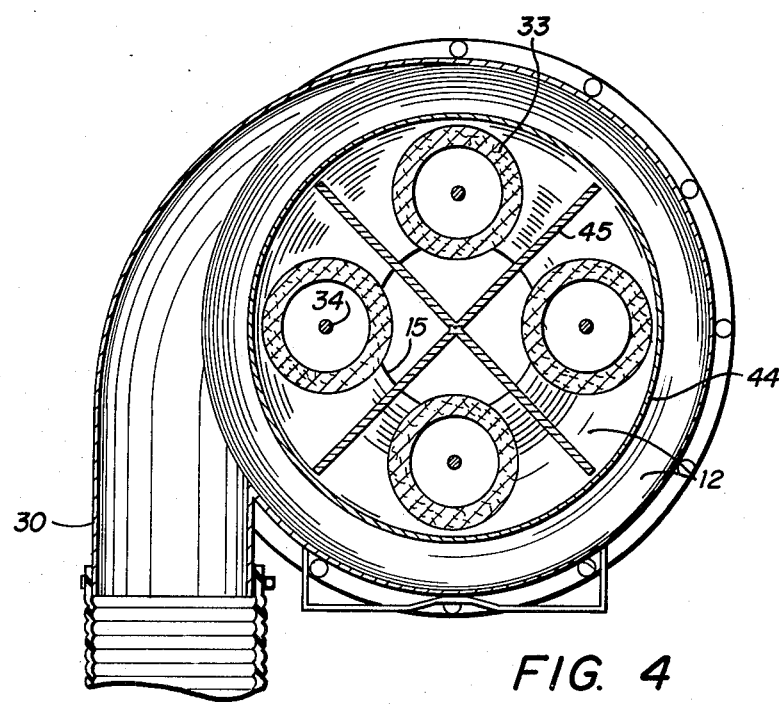
FIG. 4 is a cross-sectional view along the line 4—4 of FIG. 1.

The partitioning plate 38 divides the cylindrical housing 11 into a filtered air chamber 40 and a cyclone separator chamber 41. As shown in FIGS. 3 and 4, a plurality of circular holes 42, equal in number to the number of filter elements 33 used, are provided in the partitioning plate 38 for passage of filtered air from the inside portions of the filter elements 33 into the filtered air chamber 40. Centered in and welded to each cylindrical guide piece 37 is a tie rod support 43 having a central hole into which the upper end of a tie rod 34 is affixed. Welded to the underside of the partitioning plate 38 and surrounding the nested filter elements 33 is an inlet flow guide 44, cylindrically shaped and extended vertically downward a short distance below the bottom of the inlet transition piece 30. Divider plates 45 are also welded to the underside of partitioning plate 38 to separate the individual filter elements 33, facilitating element cleaning as described below.

A compressed air storage manifold 46 is formed around the filtered air chamber 40 in the upper part of the cylindrical housing 11 by an annular wall 47 welded between the partition plate 38 and top piece 25. Rectangular pieces, welded at their appropriate edges to the top piece 25, annular wall 47, partitioning plate 38 and cylindrical housing 11, form end walls 48a and 48b to close the air storage manifold 46. A plurality of pipe nipples 49 are installed into and through the cylindrical housing 11 for connection of the compressed air manifold 46 to an external source of compressed air through conventional air conduit means. A quick-opening valve 50 is positioned within the filtered air chamber 40 above each partitioning plate hole 42 and filter element 33 for pulse air cleaning of the elements 33. Valve mounting and connection to the compressed air manifold 46 is accomplished with standard pipe nipples 51, affixed into and through the annular wall 47. One of these valves 50 has been omitted from FIG. 3 to clearly show a tie rod 34 and tie rod support 43 positioned in a cylindrical guide piece 37.

Each valve 50 is connected to a timer 52 by a control air conduit 53 passing through annular wall 47 in a short arced space between end walls 48a and 48b, which in conjunction with portions of the top piece 25, the partitioning plate 38, the annular wall 47 and the cylindrical housing 11 defines a timer cabinet 54, accessible through a hinged door 55. In the preferred embodiment, the quick-opening valves 50 are pneumatically operated and the conduits 53 are tubing for compressed air communication with the timer 52, which is also pneumatically operated. In appropriate circumstances, electric solenoid quick-opening valves can be used in conjunction with an electrically operated timer.

In the operation of the invention, an unfiltered gas is supplied to the inlet transition piece 30 through the flexible conduit 31; as, for example, by connection of the nonillustrated end of conduit 31 to a collector of dust and cutting laden hole cleaning air over a hole being drilled by an earth hole drilling machine. The separator-filter unit 10 is size-selected to maintain an inlet air flow velocity into the inlet transition piece 30 of from 6000 to 8000 feet per minute. This flow rate results by selection of the appropriate inlet diameter on the inlet transition piece 30 for the known air flow volume. Thus, for an inlet air flow rate of 2500 cubic feet per minute, an inlet diameter of eight inches would provide for an air velocity of 7143 feet per minute. The blower unit 18 is coordinately selected to evacuate the known air flow quantity per minute from the filter-separator 10 while maintaining a vacuum in the upper filtered air chamber of ten to twelve inches below atmospheric pressure as measured on a water column manometer. The inlet transition piece 30 and inlet flow guide 44 direct the high velocity inlet air stream to smoothly flow around the inner wall surface of the cylindrical housing 11 within the chamber 41. The dust and cutting laden air stream flows at high velocity in the spiral manner of a cyclone or vortex toward the conical lower housing piece 12. During the spiral revolutions approximately ninety-eight percent, by weight, of the particulate matter carried in the air stream, including all particles large enough to damage the pleated paper filter elements, falls under the force of terrestrial gravity into the conical lower housing piece 12. An air vortex naturally develops a low pressure or vacuum in its central core where air velocity is negligible in comparison to that in the spiraling vortex. In the invention this "dead air" space is utilized to dispose the pleated paper filter elements 33 that, being required to filter only fine particulates representing approximately two percent of the total particulate matter flow, are utilized without deration from normal rated air flow volume capacity. Any water that may be carried in the inlet flow will either be cyclonically separated with the bulk of the particulate matter or vaporize in the vacuum atmosphere so that no wetting of the paper filter elements occurs.

Atmospheric pressure collapses the flexible dump hose 16, thereby preventing ambient air flow into the cyclonic separation chamber 41 through the outlet piece 15; but the collapsing force is readily overcome by terrestrial gravity acting upon accumulated particulate matter in the lower conical housing 12 so that accumulated particulate matter intermittently flows through the dump hose 16 for collection and removal.

In the lower portion of the cyclone separation chamber 41 the spiral flow of the air stream breaks down somewhat and the air turns to an upward flow toward the pleated paper filter elements 33. The air then flows along several paths in a generally radial direction toward the centers of the various filter elements 33. The fine particulates remaining in the air flow collect on the cylindrical exterior surfaces of the filter elements in the incoming air chamber 41 while the air flows on through the elements 33 and upward to the blower inlet 22 through the partitioning plate circular holes 42 and upper filtered air chamber 40. Using the standard pleated paper filter elements commercially available for off-the-road vehicle and stationary engines, the separator-filter unit 10 will remove dust and cuttings in a typical earth drilling machine application to the extent that there is no visible discharge from the blower 18.

The pneumatically operated timer 52 receives a continuous compressed air pressure signal from the manifold 46 through the control air conduits 53. When the manifold air pressure reaches the preset level, usually a pressure in the range of 40 to 50 PSIG, a single control air conduit 53 (or approximately one-fourth of such conduits if there are more than four valves 50) is exhausted through the timer 52, the timer cabinet 54 being vented to the filtered air chamber 40. A pulse air discharge valve 50 is so constructed that exhausting air pressure from a connected control air conduit 53 relieves air pressure from a chamber within the valve 50 that, in turn, causes rapid opening of a main port within the valve thereby providing a direct flow path for compressed air from the manifold 46 to a discharge opening at the downward facing surface of the valve. The valve 50 is also so constructed that the opened main port rapidly recloses, the period of port opening being 100 to 200 milliseconds. Thus, a brief pulse of high velocity air is discharged downward from the valve 50 toward and through the partitioning plate hole 42 directly below the valve, into the cylindrical interior space of the associated filter element 33 and through the pleated paper filter media against the filtered air flow so that particulate matter on the exterior cylindrical surface of the element 33 is dislodged. The dislodged particulate matter falls under the force of gravity toward the lower conical housing piece 12 and outlet 15. Divider plates 45 prevent particulate matter dislodged from a filter element 33 during the pulse cleaning process from flowing to the surface of any adjoining filter element. The timer is so constructed that the port through which the conduit 53 was exhausted closes during restoration of compressed air pressure in the manifold 46 and the conduit 53 to another of the valves 50 is exhausted when the preset 40 to 50 PSIG manifold pressure is reached. The process repeats sequentially with each valve 50 being operated in rotation to complete one cycle in approximately 24 to 40 seconds. The cycles continue so long as compressed air is supplied to the manifold 46 at the appropriate pressure, thereby providing continual cleaning of the filter elements so that high air flow velocities, at or near the filter element rating, may be maintained through the elements.

Whereas this invention is herein illustrated and described with respect to a particular embodiment, it should be realized that various changes may be made without departing from the essential contributions to the art made by the teachings hereof.

I claim:

1. A method of removing particulate matter from a gas, comprising, in combination:
   (a) connecting an inlet opening of a partitioned housing to a source of gas and particulate matter;
   (b) causing said gas and particulate matter to flow through the housing by continuously inducing a vacuum in the housing with a centrifugal blower vacuum machine means that is connected to a gas discharge opening of the housing;
   (c) causing separation of a first portion of the particulate matter from the gas by directing both the particulate matter and the gas to flow vortically in a cyclonic manner around a cylindrical interior wall of a first chamber of the housing so that terrestrial gravitational force causes said first portion of the particulate matter to fall from the vortically flowing gas toward a bottom of said first chamber;
   (d) causing separation of another portion of the particulate matter from the gas by directing the gas flow through a plurality of pleated paper filters, each filter being positioned in a low gas velocity core of the vortical gas and particulate matter flow and affixed over one of a like plurality of openings in a partitioning means between said first chamber and a second chamber of the housing, and each filter having a normal rated filtering capacity expressed in terms of a gas volume per unit time flowable through the filter and being utilized to filter such rated capacity of gas;
   (e) continually cleaning said second portion of particulate matter from the filters with counterflowing gas pulses periodically directed through the filters from the second chamber to the first chamber wherein said counterflowing gas pulses are comprised of a compressed gas from an external source being discharged through a plurality of normally-closed valves, located in the second chamber, by rapidly opening and closing, in rotation, approximately one-fourth of said valves simultaneously;
   (f) intermittently removing all of the separated first and second portions of particulate matter from the housing through a particulate matter discharge opening in the bottom of said first chamber; and
   (g) continuously removing all of said gas flowing through the housing through the gas discharge opening by use of the same vacuum means used to induce the vacuum in the housing.

2. The method of claim 1, wherein said gas from an external source is continuously supplied from the external source to a third chamber within the housing, said plurality of valves are individually connected by a gas conduit means to the third chamber and said third chamber serves as a storage reservoir for said gas from the external source.

3. The method of claim 2, wherein said approximate one-fourth of said plurality of valves are rapidly opened and closed, in rotation by control signals from a sequencing timer mounted in a fourth chamber of the housing.

4. The method of claim 3, wherein said valves are pneumatically operated, said control signals are pneumatic and said sequencing timer is pneumatically operated by the compressed gas from said third chamber.

5. An apparatus for removal of particulate matter from a continuous flow of a gas combined with the particulate matter, comprising, in combination:
   (a) a cylindrical housing means;
   (b) a frusto-conical lower housing means affixed to the cylindrical housing means;
   (c) an inlet flow connection means and an inlet flow guide means for inducing the continuous flow of gas combined with the particulate matter to flow vortically within an incoming gas chamber means of the cylindrical housing means;
   (d) a particulate matter removal aperture means in the frusto-conical lower housing means;
   (e) a centrifugal vacuum pump means affixed to a top surface of the cylindrical housing means and connected to a gas removal aperture means through a top enclosure means of the cylindrical housing means so that the vacuum pump means can provide continuous removal of said gas from a filtered gas chamber means in the cylindrical housing means;
   (f) a filter means interposed between the incoming gas chamber means and the filtered gas chamber means in the cylindrical housing means, with the filter means disposed in an upper central portion of the incoming gas chamber means and affixed to a bottom surface of an apertured partitioning plate means affixed transversely with the cylindrical housing means separating the incoming gas chamber means, and the filtered gas chamber means;

(g) a filter cleaning means comprised of a plurality of valve means, disposed within the filtered gas chamber means, for discharging a pressurized gas into said filter means in a counterflow direction and a timer means arranged to sequentially operate said valve means;

(h) pressurized gas storage means within the cylindrical housing means and conduit-connected to said valve means, to said timer means and to an external source of the pressurized gas; and (i) a timer cabinet means within the cylindrical housing means.

6. The apparatus of claim 5, wherein the gas combined with the particulate matter is cleaning air from a hole being drilled into the earth, the particulate matter is dust and cuttings from the earth and the pressurized gas is compressed air, in combination with an earth hole drilling machine and having a mounting means for affixing the apparatus to a structure of the earth hole drilling machine, being of a physical size mountable on the structure of the hole drilling machine, having a conduit means for receiving compressed air for filter cleaning from the drilling machine and designed to separate particulate matter from a known air flow volume of cleaning air being discharged from the hole being drilled into thearth by the drilling machine.

7. The apparatus of claim 5, wherein the filter means is a plurality of pleated paper filter elements, each of a cylindrical configuration and each being used for a normal rated flow capacity expressed in terms of gas volume per unit time flowing through the element, disposed within the cylindrical housing means so that all gas flowing from the incoming gas chamber means to the filtered gas chamber means must pass through a pleated paper portion of one of the elements and the particulate matter is prevented from passing through the pleated paper filter portion of any element to the extent that no visible particulate matter is discharged from the filtered gas chamber means by way of the vacuum pump means.

8. The apparatus of claim 7, wherein the plurality of valve means is comprised of several pneumatically operated individual valves designed for rapid opening and closing; the timer means is pneumatically operated and arranged to pneumatically operate approximately one-fourth of the valves simultaneously as a unit; the valves are individually conduit-connected to the timer means; the valves are normally closed against the pressurized gas; and, the valves are disposed, one above each filter element, to discharge from each operated valve a pulse of said pressurized gas downward into a core of the filter element disposed beneath that valve as each valve unit is sequentially operated by the timer means at a time interval determined by a pressure level of the gas in the gas storage means.

* * * * *